United States Patent
Groves et al.

(10) Patent No.: US 12,355,628 B2
(45) Date of Patent: Jul. 8, 2025

(54) SYSTEMS AND METHODS FOR IDENTIFYING AND ORGANIZING DEVICE CAPABILITIES INTO GRAPHICAL HIERARCHIES

(71) Applicant: Dell Products L.P., Round Rock, TX (US)

(72) Inventors: Anna Groves, Austin, MA (US); John Thomas Cardente, Milford, MA (US); Gaurav Chawla, Austin, TX (US); Douglas Lang Farley, Round Rock, TX (US); Kirk A. Frey, Flemington, NJ (US); Robert Anthony Lincourt, Jr., Franklin, MA (US); Tommi Salli, Austin, TX (US); John S. Harwood, Boston, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/160,159

(22) Filed: Jan. 26, 2023

(65) Prior Publication Data
US 2024/0259270 A1 Aug. 1, 2024

(51) Int. Cl.
*H04L 41/12* (2022.01)
*H04L 41/14* (2022.01)
*H04L 41/22* (2022.01)

(52) U.S. Cl.
CPC ............ *H04L 41/12* (2013.01); *H04L 41/145* (2013.01); *H04L 41/22* (2013.01)

(58) Field of Classification Search
CPC ........ H04L 41/12; H04L 41/145; H04L 41/22
See application file for complete search history.

(56) References Cited

U.S. PATENT DOCUMENTS

| | | | |
|---|---|---|---|
| 6,336,138 B1 * | 1/2002 | Caswell | H04L 41/5058 709/224 |
| 2018/0210927 A1 * | 7/2018 | Karam | G06F 16/24568 |
| 2019/0334773 A1 * | 10/2019 | Harneja | G06F 11/2289 |

\* cited by examiner

*Primary Examiner* — Emmanuel L Moise
*Assistant Examiner* — Zia Khurshid
(74) *Attorney, Agent, or Firm* — Chamberlain, Hrdlicka, White, Williams & Aughtry; Aly Z. Dossa

(57) ABSTRACT

A method for generating a domain topology for a system, the method that includes accessing a functional model database, identifying, in a computing resource database, a configuration of components matching a functional model in the functional model database, generating a domain for the configuration of components, in a domain topology, and generating a graphical hierarchy of the domain topology and providing it to a user.

8 Claims, 12 Drawing Sheets

SYSTEMS AND METHODS FOR IDENTIFYING AND ORGANIZING DEVICE CAPABILITIES INTO GRAPHICAL HIERARCHIES

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

DETAILED DESCRIPTION

General Notes

Figure 1A:
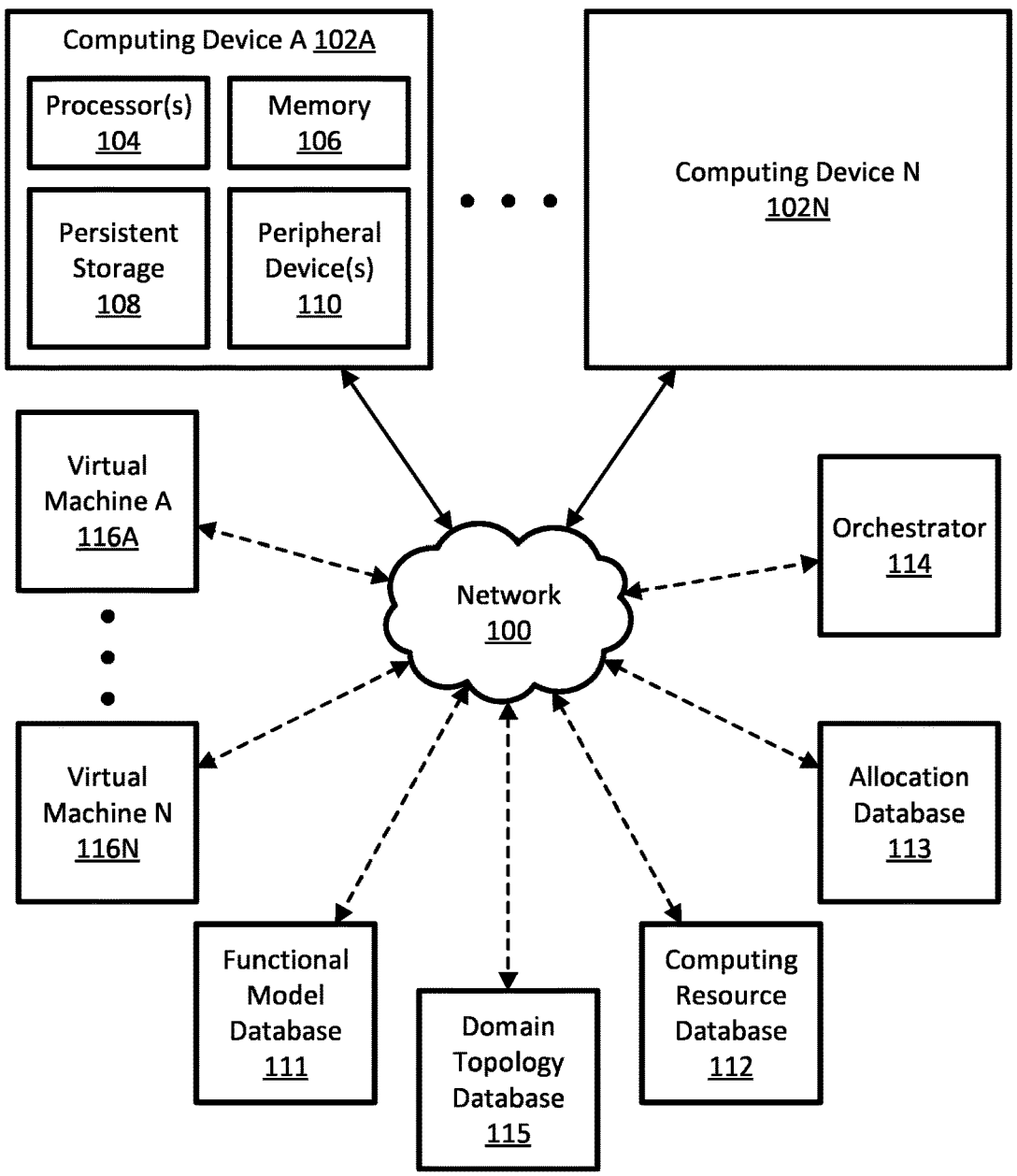
FIG. 1A shows a diagram of a system, in accordance with one or more embodiments.

As it is impracticable to disclose every conceivable embodiment of the described technology, the figures, examples, and description provided herein disclose only a limited number of potential embodiments. One of ordinary skill in the art would appreciate that any number of potential variations or modifications may be made to the explicitly disclosed embodiments, and that such alternative embodiments remain within the scope of the broader technology. Accordingly, the scope should be limited only by the attached claims. Further, certain technical details, known to those of ordinary skill in the art, may be omitted for brevity and to avoid cluttering the description of the novel aspects.

For further brevity, descriptions of similarly-named components may be omitted if a description of that similarly-named component exists elsewhere in the application. Accordingly, any component described with regard to a specific figure may be equivalent to one or more similarly-named components shown or described in any other figure, and each component incorporates the description of every similarly-named component provided in the application (unless explicitly noted otherwise). A description of any component is to be interpreted as an optional embodiment—which may be implemented in addition to, in conjunction with, or in place of an embodiment of a similarly-named component described for any other figure.

Lexicographical Notes

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" is used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

Overview and Advantages

In general, this application discloses one or more embodiments of systems and methods for identifying and organizing computing devices into topological domain hierarchies based on computing devices' capabilities and defined functionalities.

One major disadvantage of conventional domain topology modeling is that it may be time-consuming and resource-intensive to produce the desired topology. Creating and maintaining models may require a significant amount of manual effort (i.e., human input) and introduce the potential for human error. Further, manually configured domain modeling can also be a limitation in terms of scalability. Depending on the complexity of the models and the amount of data being handled, it may be difficult to modify manually-configured models to match the underlying system. Therefore, if maintaining accurate domain models is desired, model maintenance may place a significant limitation on an organization's ability to modify their systems.

Further, conventional models are often designed based on raw resource utilization and workloads—often detached from the broader context from which they were created. As a non-limiting example, computing resources (e.g., like graphic processing units (GPUs)) may be clustered into a "domain" based merely on the fact that those computing resources all share the same device-type property (i.e., being a GPU). Additionally, an entire physical computing device may be grouped into a domain based on a workload that is a frequently processed on that computing device—even though many of the computing resources within that computing device are not utilized for that workload (and may be used for other, unrelated tasks). Further, conventional domain modeling may fail to recognize related parallel workloads operating on other computing devices. That is, as another non-limiting example, a computing device that regularly processes security camera video streams may fail to be associated with the security cameras that simultaneously perform parallel processing locally on the camera—as the workloads are performed independently on different devices and therefore not grouped.

To address some of the issues with the conventional technologies, as disclosed in one or more embodiments herein, functional models may be defined based on capabilities and functionality (instead of resources and workloads) and dynamically mapped to appropriate computing resources based on those defined functionalities. Then, for newly-built or upgraded systems, a list of capabilities may be offered that rely on those functional models as a "blueprint" to aggregate and allocate the required resources. For already-built systems, domain modeling may be retroactively performed—algorithmically—to identify the defined functional models in the underlying system. And, by grouping system components (e.g., virtual machines, containers, services, workloads, specific hardware devices, etc.) into domains based on the identified functional models, domain topologies may be programmatically created with varying levels of complexity based on the shared properties of the identified domains. Domain topologies (and graphical hierarchies generated therefrom) based on functional models may be easier to interpret thereby aiding in a broader understanding of a complex system's operation and allowing for more intelligent modifications to the system.

As discussed further herein, domain topologies may be presented to a user of the system (e.g., as a graphical hierarchy) and used to manage the system. That is, components of the system can be easier to identify, optimize, and troubleshoot when presented based on their functionality. As a non-limiting example, if a particular service stops functioning as designed, the graphical hierarchy allows for a user to more easily identify the underlying hardware and software components that compose that service. Accordingly, each of these components can be individually examined to identify any issues. As another non-limiting example, if a user desires to duplicate existing services in their system (e.g., adding an additional production line in a manufacturing facility), the system components necessary to duplicate the hardware and software are similarly easier to identify (e.g., software/machinery for visual identification, fabrication, and printing, etc.).

The following sections describe figures which are directed to various non-limiting embodiments of the technology.

FIG. 1A

FIG. 1A shows a diagram of a system, in accordance with one or more embodiments. While a specific configuration of a system is shown, other configurations may be used without departing from the disclosed embodiment. Accordingly, embodiments disclosed herein should not be limited to the configuration of devices and/or components shown.

In one or more embodiments, a system may include one or more computing device(s) (102), a network (100), an orchestrator (114), one or more virtual machine(s) (116), and one or more database(s) (e.g., a functional model database (111), a domain topology database (115), a computing resource database (112), and an allocation database (113)). Each of these components is described below.

In one or more embodiments, a network (e.g., network (100)) is a collection of connected network devices (not shown) that allow for the communication of data from one network device to other network devices, or the sharing of resources among network devices. Non-limiting examples of a network (e.g., network (100)) include a local area network (LAN), a wide area network (WAN) (e.g., the Internet), a mobile network, any combination thereof, or any other type of network that allows for the communication of data and sharing of resources among network devices and/or computing devices (102) operatively connected to the network (100). One of ordinary skill in the art, having the benefit of this detailed description, would appreciate that a network is a collection of operatively connected computing devices that enables communication between those computing devices.

In one or more embodiments, a computing device (e.g., computing device A (102A), computing device N (102N)) is hardware that includes any one, or combination, of the following components:
 (i) processor(s) (104) (described below),
 (ii) memory (106) (described below),
 (iii) persistent storage (108) (described below),
 (iv) communication interface(s) (e.g., network ports, small form-factor pluggable (SFP) ports, wireless network devices, etc.) (described below),
 (v) internal physical interface(s) (e.g., serial advanced technology attachment (SATA) ports, peripheral component interconnect (PCI) ports, PCI express (PCIe) ports, next generation form factor (NGFF) ports, M.2 ports, etc.),
 (vi) external physical interface(s) (e.g., universal serial bus (USB) ports, recommended standard (RS) serial ports, audio/visual ports, etc.),
 (vii) input and output device(s) (e.g., mouse, keyboard, a visual display device (monitor), joystick, gamepad, other human interface devices, compact disc (CD) drive, other non-transitory computer readable medium (CRM) drives, etc.), and/or
 (viii) peripheral device(s) (110) operatively connected to internal and/or external physical interface(s) (e.g., graphics processing unit (GPU), data processing unit (DPU), sound card, audio/video capture card, etc.).

Non-limiting examples of a computing device (102) include a general purpose computer (e.g., a personal computer, desktop, laptop, tablet, smart phone, etc.), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of computing device (102) with the aforementioned capabilities. In one or more embodiments, a computing device (102) may be operatively connected to another computing device (102) via a network (100).

In one or more embodiments, a processor (104) is an integrated circuit for processing computer instructions. In one or more embodiments, persistent storage (108) (and/or memory (106)) may store software that is executed by the processor(s) (104). A processor (104) may be one or more processor cores or processor micro-cores.

In one or more embodiments, memory (106) is one or more hardware devices capable of storing digital information (e.g., data) in a non-transitory medium. In one or more embodiments, when accessing memory (106), software may be capable of reading and writing data at the smallest units of data normally accessible (e.g., "bytes"). Specifically, in one or more embodiments, memory (106) may include a unique physical address for each byte stored thereon, thereby enabling software to access and manipulate data stored in memory (106) by directing commands to a physical address of memory that is associated with a byte of data (e.g., via a virtual-to-physical address mapping). Non-limiting examples of memory (106) devices include flash memory, random access memory (RAM), dynamic RAM (DRAM), static RAM (SRAM), and resistive RAM (Re-RAM). In one or more embodiments, memory (106) may be volatile or non-volatile.

In one or more embodiments, persistent storage (108) (i.e., "storage") is one or more hardware devices capable of storing digital information (e.g., data) in a non-transitory medium. Non-limiting examples of persistent storage (108) include integrated circuit storage devices (e.g., solid-state drive (SSD), Non-Volatile Memory Express (NVMe), flash memory, etc.), magnetic storage (e.g., hard disk drive (HDD), floppy disk, tape, diskette, etc.), and optical media (e.g., compact disc (CD), digital versatile disc (DVD), etc.). In one or more embodiments, prior to reading and/or manipulating data located on persistent storage (108), data may first be required to be copied in "blocks" (instead of "bytes") to other, intermediary storage mediums (e.g., memory) where the data can then be accessed in "bytes".

In one or more embodiments, a communication interface is a hardware component that provides capabilities to interface a computing device (102) with one or more other computing device(s) (102) (e.g., through a network (100) to another computing device (102), another server, a network of devices, etc.) and allow for the transmission and receipt of data with those devices. A communication interface may communicate via any suitable form of wired interface (e.g., Ethernet, fiber optic, serial communication etc.) and/or wireless interface and utilize one or more protocols for the transmission and receipt of data (e.g., transmission control protocol (TCP)/internet protocol (IP), remote direct memory access (RDMA), Institute of Electrical and Electronics Engineers (IEEE) 801.11, etc.).

As used herein, "software" means any set of instructions, code, and/or algorithms that are used by a computing device (102) to perform one or more specific task(s), function(s), or process(es). A computing device (102) may execute software (e.g., via processor(s) (104) and memory (106)) which read and write data stored on one or more persistent storage device(s) (108) and/or memory device(s) (106). Software may utilize resources from one or more computing device(s) (102) simultaneously and may move between computing devices (102), as commanded (e.g., via network (100)). Additionally, multiple software instances may execute on a single computing device (102) simultaneously.

In one or more embodiments, a computing resource is any one of the components, or subcomponents, of a computing device (102). Computing resources may be allocated to software (e.g., virtual machines (116)) for use by that software. Non-limiting examples of a computing resource include a processor (104), a processor core, a processor thread, any range of memory (106), any block(s) on a persistent storage (108) device, and any peripheral device components or sub-components (e.g., a GPU, a portion of processing time on a GPU, etc.).

In one or more embodiments, a stranded computing resource (or stranded resource) is an unused and/or unallocated computing resource where most of the rest of the physical hardware components has been allocated. As a non-limiting example, if 30 GB of a 32 GB memory (106) device is allocated, the remaining unallocated 2 GB may be a "stranded resource". As another non-limiting example, if seven cores of an eight-core processor (104) are allocated, the remaining, unallocated core would be a "stranded resource".

In one or more embodiments, a functional model database (111) is a data structure which includes information about one or more functional model(s) (140). Additional details regarding the functional model database (111) may be found in the description of FIG. 1C.

In one or more embodiments, a domain topology database (115) is a data structure which includes information about one or more domain(s) and their association with one or more components of the system. Additional details regarding the domain topology database (115) may be found in the description of FIG. 1D.

In one or more embodiments, a computing resource database (112) is a data structure which includes information about computing resources. Additional details regarding the computing resource database (112) may be found in the description of FIG. 1E.

In one or more embodiments, an allocation database (113) is a data structure which includes information about the allocation of computing resources. Additional details regarding the allocation database (113) may be found in the description of FIG. 1F.

In one or more embodiments, an orchestrator (114) is software, executing on a computing device, which manages (e.g., creates, generates, initiates, scales, terminates, etc.) virtual machines (116). An orchestrator (114) may use the computing resource database (112) to identify, locate, and allocate computing resources of one or more computing device(s) (102) to virtual machines. Additional details regarding the functions of the orchestrator (114) may be found in the description of FIGS. 2A-C.

In one or more embodiments, a virtual machine (e.g., virtual machine A (116A), virtual machine (116N)) is software, executing on one or more computing device(s) (102), that provides a virtual environment in which other software (e.g., a program, a process) may execute. In one or more embodiments, a virtual machine (116) is created by an orchestrator (114) and is allocated computing resources (e.g., processor(s) (104), memory (106), persistent storage (108), peripheral device(s) (110)) that are represented as virtual resources, within the virtual machine (116), and utilized by the software executing therein. Virtual resources may be aggregated from one or more computing device(s) (102) and presented as a unified entity to software executing in the virtual machine (116). As a non-limiting example, a single continuous virtual memory region may correspond to two different physical memory devices (106) physically disposed in two different computing devices (102). Similarly, as another non-limiting example, a virtual machine may provide a virtual processor that corresponds to one or more physical processor(s) (104), only a portion of a single processor (104), and/or two or more portions of two or more processors (104), respectively.

In one or more embodiments, a virtual machine (116) supports the smart data accelerator interface (SDXI) protocol for memory-to-memory data transfer. Further utilization of the SDXI protocol allows for secure communication over memory channels, including the exposure of virtual resources (e.g., virtual processor(s), virtual memory, virtual storage, virtual peripheral devices) and to securely read, write, and process data using those resources. Further, the SDXI protocol allows for the chaining of multiple virtual machines (116) together to allow for a secure "pipeline" of data processing from one virtual machine to another.

FIG. 1B

Figure 1B:
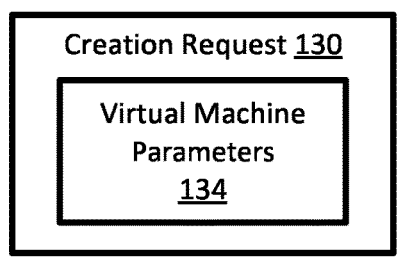
FIG. 1B shows a diagram of a creation request, in accordance with one or more embodiments.

FIG. 1B shows a diagram of a creation request, in accordance with one or more embodiments. While a specific configuration of a creation request is shown, other configurations may be used without departing from the disclosed embodiment. Accordingly, embodiments disclosed herein should not be limited to the configuration of devices and/or components shown.

In one or more embodiments, a creation request (130) is a data structure that includes virtual machine parameters (134). Virtual machine parameters (134) include metadata about a virtual machine (116), used by the orchestrator (114), to create and maintain the virtual machine (116). In one or more embodiments, virtual machine parameters may include:
 (i) the computing resources required to execute the virtual machine (e.g., two x86 processor threads, 8 GB of RAM, three GPUs, etc.),
 (ii) policies of the virtual machine (e.g., processor (104) cores must be on the same computing device (102), entire memory (106) device must be exclusive, "best available" hardware, geographic requirements etc.),
 (iii) customer information (e.g., name, account number, contact information, etc.),
 (iv) a functional model identifier (142), and/or
 (v) any other information about a virtual machine (116).

FIG. 1C

Figure 1C:
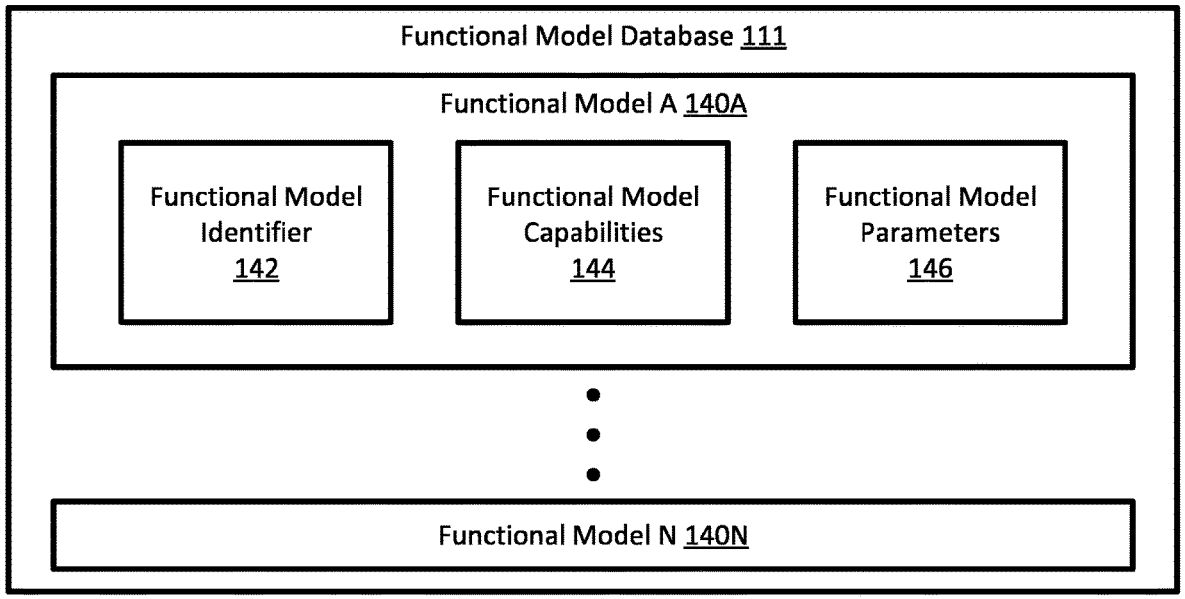
FIG. 1C shows a diagram of a functional model database, in accordance with one or more embodiments.

FIG. 1C shows a diagram of a functional model database, in accordance with one or more embodiments. While a specific configuration of a functional model database is shown, other configurations may be used without departing from the disclosed embodiment. Accordingly, embodiments disclosed herein should not be limited to the configuration of devices and/or components shown.

In one or more embodiments, a functional model database (111) is a data structure that may include one or more functional model(s) (e.g., functional model A (140A), functional model N (140N)). In one or more embodiments, a functional model (140) is a data structure that includes any one, or combination, of the following data:
 (i) a functional model identifier (142) that uniquely identifies a single associated functional model (140) (non-limiting examples of an identifier include a tag, an alphanumeric entry, a filename, and a row number in table),
 (ii) functional model capabilities (144) (described below), and/or
 (iii) functional model parameters (146) (described below).

In one or more embodiments, functional model capabilities (144) are a description of the services and functionalities offered by the functional model (140). Functional model capabilities (144) may be provided in (i) human-readable text (e.g., "a functional model for handling incoming high-frequency stock options data"), and/or (ii) quasi-human-computer-readable text (e.g., "security-hash-md5-salt").

In one or more embodiments, functional model parameters (146) include metadata about a functional model (140), used by the orchestrator (114), to create and maintain the functional model (140). In one or more embodiments, functional model parameters (146) may include (i) the computing resources required to execute the functional model (140) (e.g., two x86 processor threads, 8 GB of RAM, three GPUs, etc.), (ii) policies of the functional model (140) (e.g., isolation requirements), (iii) the operating system required to execute the functional model (140), (iv) compatibility and interoperability with other functional models (140), and/or (v) any other information about a functional model (140).

In one or more embodiments, a function model (140) may be considered a "blueprint", "recipe", and/or "manifest" that is used to create a virtual machine (or other hardware-software-instance) to serve a particular function (e.g., the advertised functional model capability).

FIG. 1D

Figure 1D:
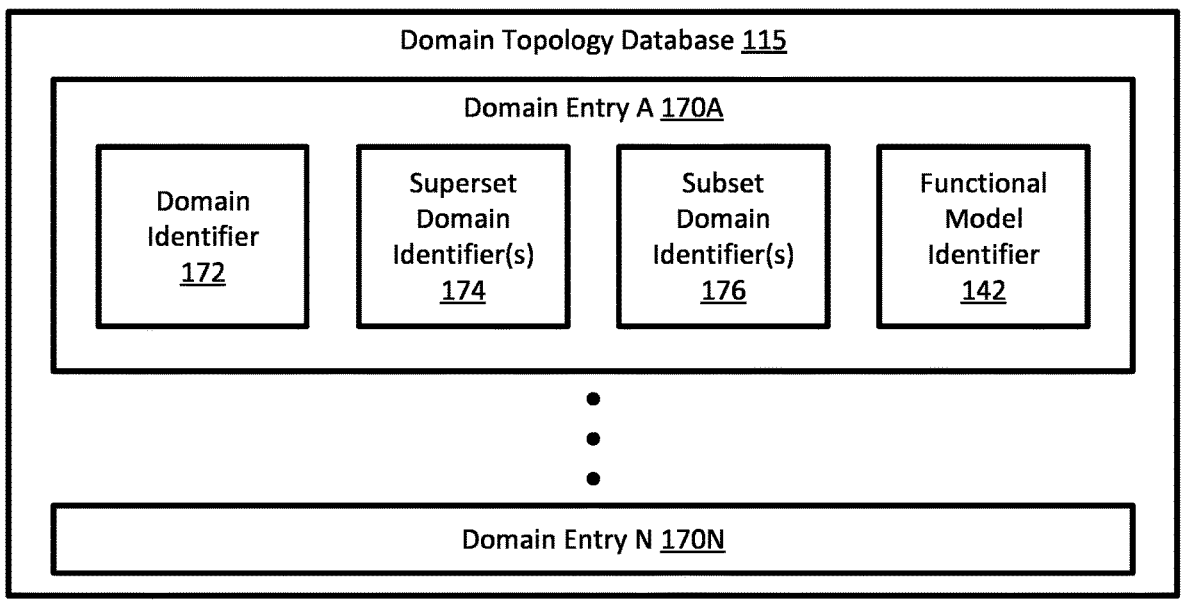
FIG. 1D shows a diagram of a domain topology database, in accordance with one or more embodiments.

FIG. 1D shows a diagram of a domain topology database, in accordance with one or more embodiments. While a specific configuration of a domain topology database is shown, other configurations may be used without departing from the disclosed embodiment. Accordingly, embodiments disclosed herein should not be limited to the configuration of devices and/or components shown.

In one or more embodiments, a domain topology database (115) is a data structure that may include one or more domain entries (e.g., domain entry A (170A), domain entry N (170N)). In one or more embodiments, a domain entry (170) is a data structure that includes any one, or combination, of the following data:
 (i) a domain identifier (172) that uniquely identifies a single domain (117) or subdomain (117) associated with the domain entry (170),
 (ii) superset domain identifier(s) (174) that uniquely identify one or more domain(s) of which the domain (117) (associated with the domain entry (170)) is a part (e.g., subset) of,
 (iii) subset domain identifier(s) (176) that uniquely identify one or more domain(s) that are a part (e.g., subset) of the domain (117) (associated with the domain entry (170)), and
 (iv) a functional model identifier (142) that uniquely identifies a single associated functional model (140).

In one or more embodiments, a domain entry (170) is created for each domain in a domain topology.

FIG. 1E

Figure 1E:
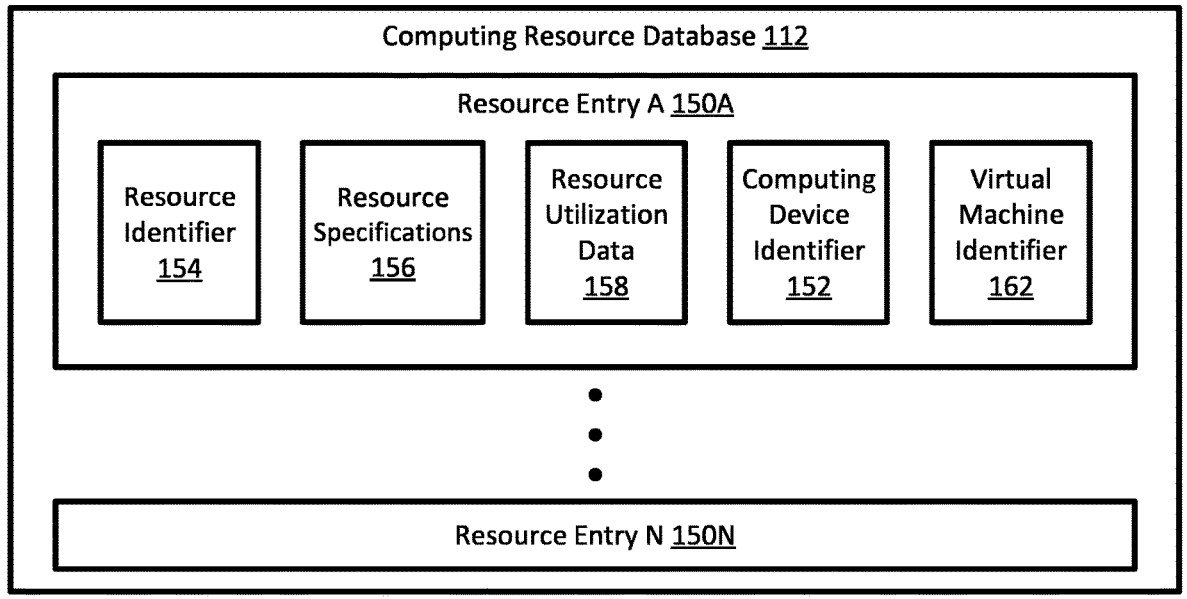
FIG. 1E shows a diagram of a computing resource database, in accordance with one or more embodiments.

FIG. 1E shows a diagram of a computing resource database, in accordance with one or more embodiments. While a specific configuration of a computing resource database is shown, other configurations may be used without departing from the disclosed embodiment. Accordingly, embodiments disclosed herein should not be limited to the configuration of devices and/or components shown.

In one or more embodiments, a computing resource database (112) is a data structure that includes one or resource entries (e.g., resource entry A (150A), resource entry N (150N)). In one or more embodiments, a resource entry (150) is a data structure that includes any one, or combination, of the following data:

(i) a resource identifier (154) that uniquely identifies a single computing resource associated with the resource entry (150). In one or more embodiments, a single computing resource may be a portion of a larger computing resource (e.g., each core of a single processor (104) may have its own resource entry (150)), (ii) resource specifications (156) that provides information about a computing resource (i.e., the computing resource uniquely identified by the resource identifier (154)) (described below), (iii) resource utilization data (158) that includes data related to the usage of a computing resource (i.e., the computing resource uniquely identified by the resource identifier (154)) (described below), (iv) a computing device identifier (152) that uniquely identifies a single computing device associated with the resource entry (150), and/or (v) a virtual machine identifier (162) that uniquely identifies a single virtual machine (116) associated with the computing resource that is uniquely identified by the resource identifier (154), In one or more embodiments, resource specifications (156) detail the properties, features, and functionalities of a computing resource. As a non-limiting example, if the computing resource is a processor (104), then the resource specifications (156) may specify one or more properties of the processor(s) (104), including the architecture (e.g., x86, ARM, etc.), the manufacturer/model, core count, thread count, clock speed(s), cache size, memory channels, and/or any other information about the specific processor (104). As another non-limiting example, if the computing resource is associated with a memory (106) device, then the resource specifications (156) may specify one or more properties of the memory device(s) (106), including the capacity (e.g., 4 GB, 32 GB, etc.), clock frequency, cell type (e.g., DRAM, SRAM, etc.), and/or any other information about the specific memory (106) device. As a third non-limiting example, if the computing resource is a persistent storage (108) device, then the resource specifications (156) may specify properties of the persistent storage (108), including the capacity (e.g., 512 GB, 12 TB, etc.), type (e.g., magnetic disk, solid state, etc.), read/write speed, spin speed (if applicable), and/or any other information about the specific persistent storage (108) device.

In one or more embodiments, resource utilization data (158) includes measurements of usage and capacity of computing resources. Non-limiting examples of resource utilization data (158) include, but are not limited to, (i) processor (104) utilization (e.g., 50%, 5 of 8 cores in use), (ii) memory (106) utilization (e.g., 14 GB used, 2 GB available), (iii) persistent storage utilization (e.g., 1.3 TB used, 10.7 TB free), and/or (iv) GPU utilization (e.g., "in use", "not in use"), etc.

FIG. 1F

Figure 1F:
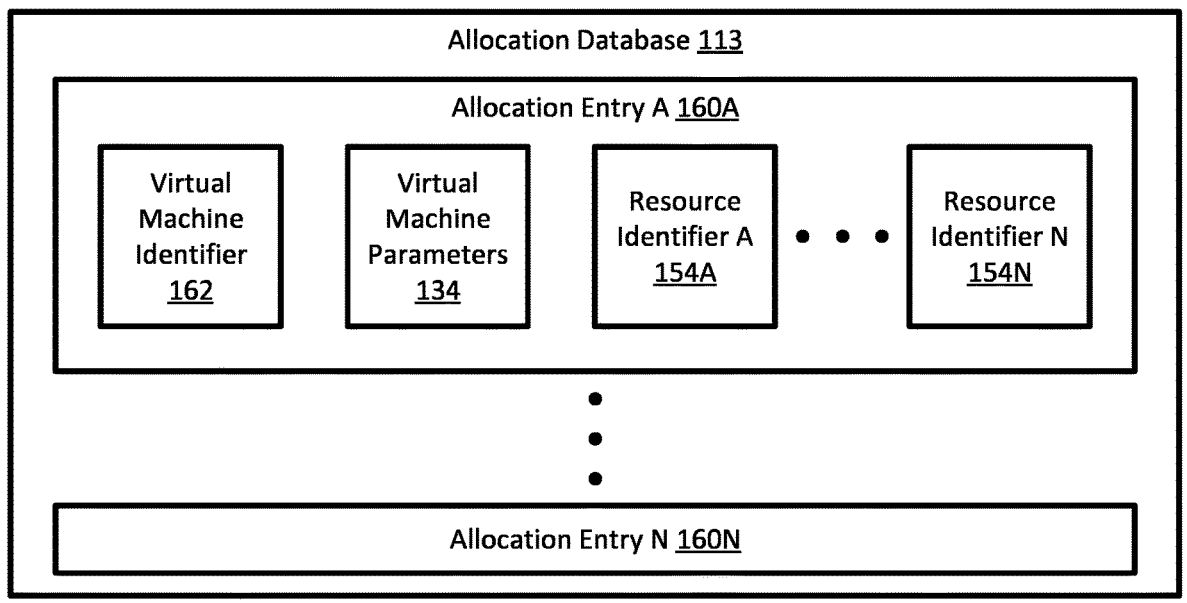
FIG. 1F shows a diagram of an allocation database, in accordance with one or more embodiments.

FIG. 1F shows a diagram of an allocation database, in accordance with one or more embodiments. While a specific configuration of an allocation database is shown, other configurations may be used without departing from the disclosed embodiment. Accordingly, embodiments disclosed herein should not be limited to the configuration of devices and/or components shown.

In one or more embodiments, an allocation database (113) is a data structure that may include one or more allocation entries (e.g., allocation entry A (160A), allocation entry N (160N)). In one or more embodiments, an allocation entry (160) is a data structure that includes any one, or combination, of the following data:

(i) a virtual machine identifier (162) that uniquely identifies a single virtual machine (116) associated with the allocation entry (160), (ii) virtual machine parameters (134) (discussed in the description of FIG. 1C), and/or (iii) one or more resources identifiers (e.g., resource identifier A (154A), resource identifier N (154N)) that each identify a single computing resource associated with the allocation entry (160). Each resource identifier (154) is uniquely associated with a single resource entry (150) in the computing resource database (112).

FIG. 1G

Figure 1G:
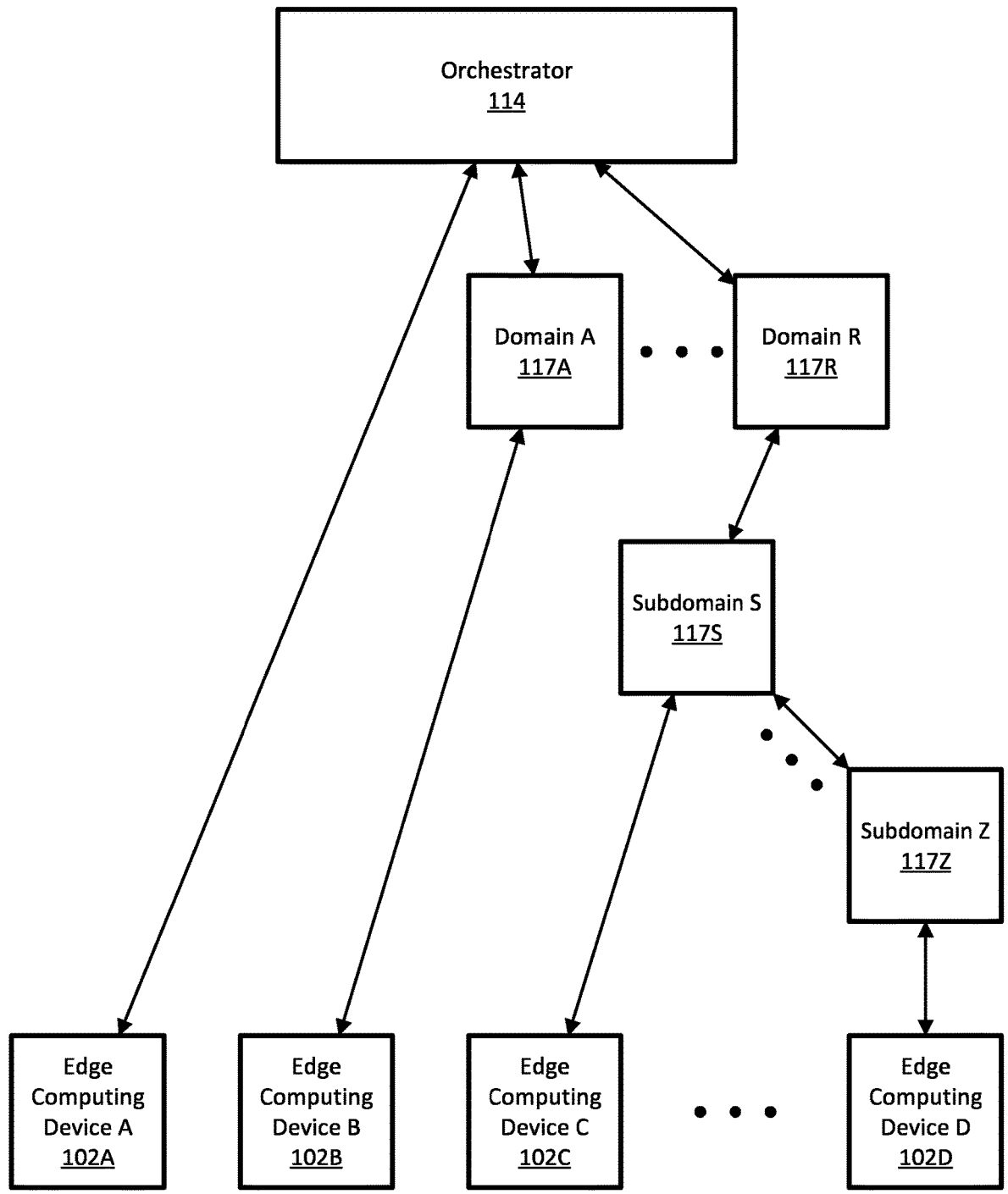
FIG. 1G shows a diagram of a domain topology of a system (e.g., as a graphical hierarchy), in accordance with one or more embodiments.

FIG. 1G shows a diagram of a domain topology of a system (e.g., as a graphical hierarchy), in accordance with one or more embodiments. While a specific configuration of a graphical hierarchy is shown, other configurations may be used without departing from the disclosed embodiment. Accordingly, embodiments disclosed herein should not be limited to the configuration of devices and/or components shown.

In one or more embodiments, a graphical hierarchy is a visual representation of a domain topology sorted into logical domain(s) (117) and organized to show inclusion of other components (e.g., other domains, devices, etc.). A domain topology may exist exclusively as a data structure (e.g., domain topology database (115)). However, a visual layout of a domain topology, as shown in FIG. 1G, necessarily forms a graphical hierarchy of that domain topology.

As shown in FIG. 1G, any one component "includes" (e.g., is associated with) any second component, below the first component, with a line directly connecting the components. For example, as shown in FIG. 1G, subdomain S (117S) includes edge computing device C (102C) and subdomain Z (117Z) as subdomain Z (117Z) and edge computing device C (102C) are vertically lower than subdomain S (117S) and there is a line directly connecting each to subdomain S (117S).

In one or more embodiments, a domain (e.g., domain A (117A), domain R (117R)) is a logical data construct of one or more virtual machine(s), container(s), workload(s), databases, and/or specific hardware device(s) (e.g., computing device(s), peripheral device(s)) that are grouped based on some shared property (e.g., satisfying the same functional model parameters (146)). Further, a domain (117) may include one or more subdomain(s) (e.g., subdomain S (117S), subdomain Z (117Z)). In one or more embodiments, a subdomain (117) is a domain that is part of a larger domain (117) or another subdomain (117).

As a non-limiting example, a domain (117) may "include" (e.g., be associated with) a virtual machine (116) composed for processing sales data, a storage volume that stores the sales data, and one or more edge computing device(s) (102) (e.g., cash registers) that generate the sales data. In such an example, the virtual machine (116), storage volume, and cash registers are logically grouped because they all relate to infrastructure needed to transact sales (e.g., in a store).

In one or more embodiments, an orchestrator (114) may (i) directly interact with an edge computing device (i.e., edge computing device A (102A)), (ii) interact through a single domain (i.e., domain A (117A)) to an edge computing device (i.e., edge computing device B (102B)), (iii) interact through a domain (i.e., domain R (117R)) and a subdomain (i.e., subdomain S (117S)) to an edge computing device (i.e., edge computing device C (102C)), (iv) interact through a domain (i.e., domain R (117R)) and two subdomains (i.e., subdomain S (117S), subdomain Z (117Z)) to an edge computing device (i.e., edge computing device D (102D)), and/or (v) interact through any number of (sub)domains (117) to an edge computing device (102).

FIG. 2A

Figure 2A:
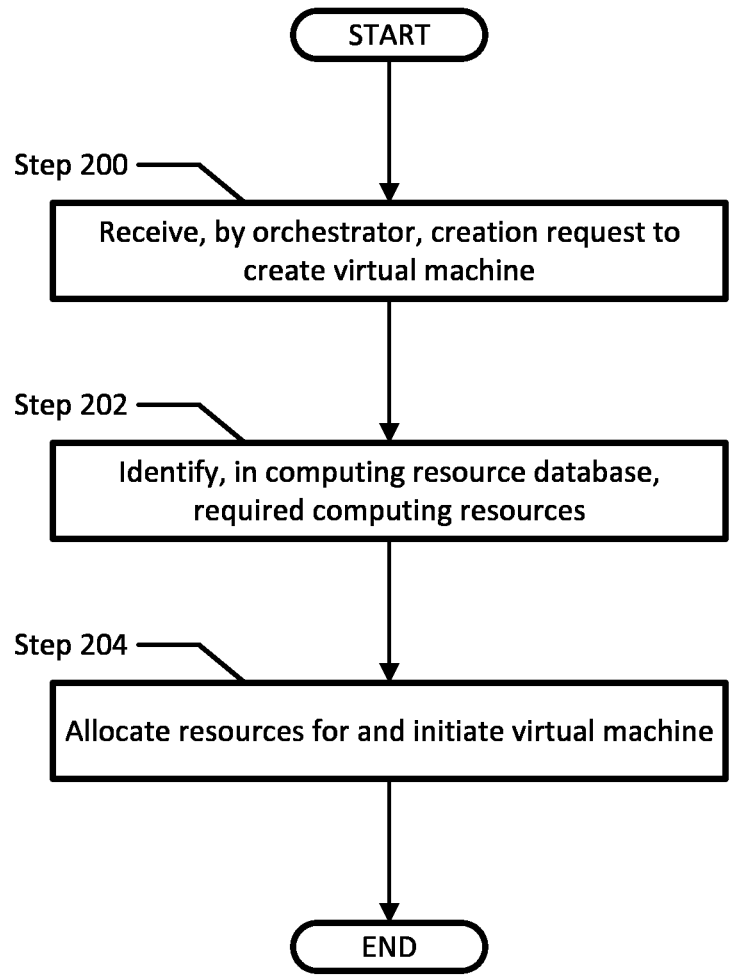
FIG. 2A shows a flowchart of a method for creating a virtual machine, in accordance with one or more embodiments.

FIG. 2A shows a flowchart of a method for creating a virtual machine, in accordance with one or more embodiments. All or a portion of the method shown may be performed by the orchestrator. However, another component of the system may perform this method without departing from the embodiments disclosed herein. While the various steps in this flowchart are presented and described sequentially, one of ordinary skill in the relevant art (having the benefit of this detailed description) would appreciate that some or all of the steps may be executed in different orders, combined, or omitted, and some or all steps may be executed in parallel.

In Step 200, the orchestrator receives a creation request to create a virtual machine for a functional model. As discussed in the description of FIG. 1B, the creation request may specify virtual machine parameters specifying the minimum requirements and constraints required for the virtual machine. In one or more embodiments, the orchestrator generates the virtual machine parameters based on the functional model parameters associated with a functional model identifier (included in the creation request).

In Step 202, the orchestrator identifies suitable computing resources, via the computing resource database, which satisfy the requirements specified in the virtual machine parameters and/or functional model parameters. In one or more embodiments, the orchestrator performs a lookup, in the computing resource database, to identify and locate resource entries matching, satisfying, or exceeding one or more of the specified requirements (of the virtual machine parameters and/or functional model parameters).

As a non-limiting example, functional model parameters may require four processor cores for the creation of a new virtual machine. Further, the functional model parameters may require that the four processor cores be located in the same computing device and be utilized exclusively by the virtual machine. In such an instance, the orchestrator searches the computing resource database and identifies four available (e.g., unallocated, unused) processor cores within the same computing device.

In Step 204, the orchestrator allocates the identified computing resources for the virtual machine and initiates the virtual machine using those resources. The allocated computing resources may be treated as virtual resources within the virtual machine (e.g., one or more physical processor(s) may be represented as one or more virtual resource(s) in the virtual machine). After allocating the computing resources for the virtual machine, the orchestrator initiates execution of the virtual machine by 'booting up' the virtual machine.

FIG. 2B

Figure 2B:
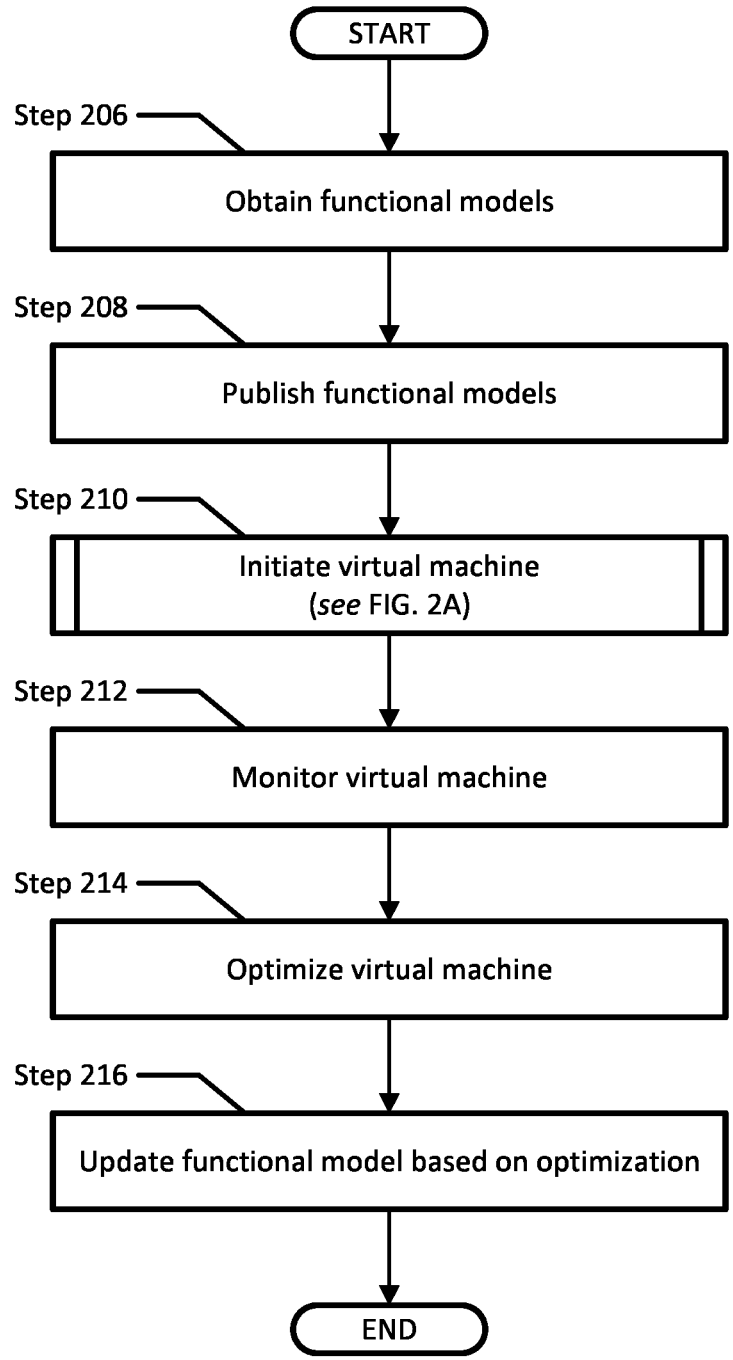
FIG. 2B shows a flowchart of a method for managing functional models and virtual machines, in accordance with one or more embodiments.

FIG. 2B shows a flowchart of a method for managing functional models and virtual machines, in accordance with one or more embodiments. All or a portion of the method shown may be performed by the orchestrator. However, another component of the system may perform this method without departing from the embodiments disclosed herein. While the various steps in this flowchart are presented and described sequentially, one of ordinary skill in the relevant art (having the benefit of this detailed description) would appreciate that some or all of the steps may be executed in different orders, combined, or omitted, and some or all steps may be executed in parallel.

In Step 206, the orchestrator obtains functional models and stores them in the functional model database. In one or more embodiments, functional models may be user-defined. As a non-limiting example, a human may manually configure the functional model parameters and generate the functional model capabilities for the functional model. In one or more embodiments, functional models may be generated by monitoring the components of a system and forming logical groups of related, parallel, and sequential software and connected components.

In Step 208, the orchestrator publishes the functional models (e.g., publishing the functional model database). In one or more embodiments, the orchestrator may publish the functional model database by offering an application programming interface (API) that may be used to programmatically access the contents of the functional model database (and any functional models therein). In one or more embodiments, a user interface may be provided where a user may select from the available functional models (e.g., a web interface with a table of functional models, a locally installed application with a dropdown list of functional models, etc.).

In Step 210, the orchestrator initiates a virtual machine. This step is substantially similar to the process described in FIG. 2A.

In Step 212, the orchestrator monitors the virtual machine's utilization of computing resources. In one or more embodiments, the orchestrator may request and receive (or otherwise obtain) utilization data from a computing resource and/or a computing resource may publish (or otherwise 'push') utilization data to the virtual machine manager. In turn, upon receipt of utilization data from a computing resource, the orchestrator updates the utilization data in the respective resource entry (of the computing resource database).

In Step 214, the orchestrator optimizes the virtual machine based on the utilization. In one or more embodiments, the orchestrator may scale-up or scale-down one or more functional model parameters based on the gathered resource utilization data. As a non-limiting example, if the virtual machine is allocated 8 GB of RAM, but never uses more than 3.6 GB, the orchestrator may deallocate 4 GB of RAM leaving the virtual machine with only 4 GB (still more than used by the virtual machine). As another non-limiting example, if a virtual machine is using 100% capacity of two processors cores, the orchestrator may allocate additional processor cores to the virtual machine until utilization is consistently under 100%.

In Step 216, the orchestrator updates the functional model based on the optimization. In one or more embodiments, if the orchestrator allocated additional resource to, or deallocated resources from the virtual machine, the orchestrator modifies the functional model parameters to specify the resource specifications utilized by the virtual machine after the optimization.

FIG. 2C

Figure 2C:
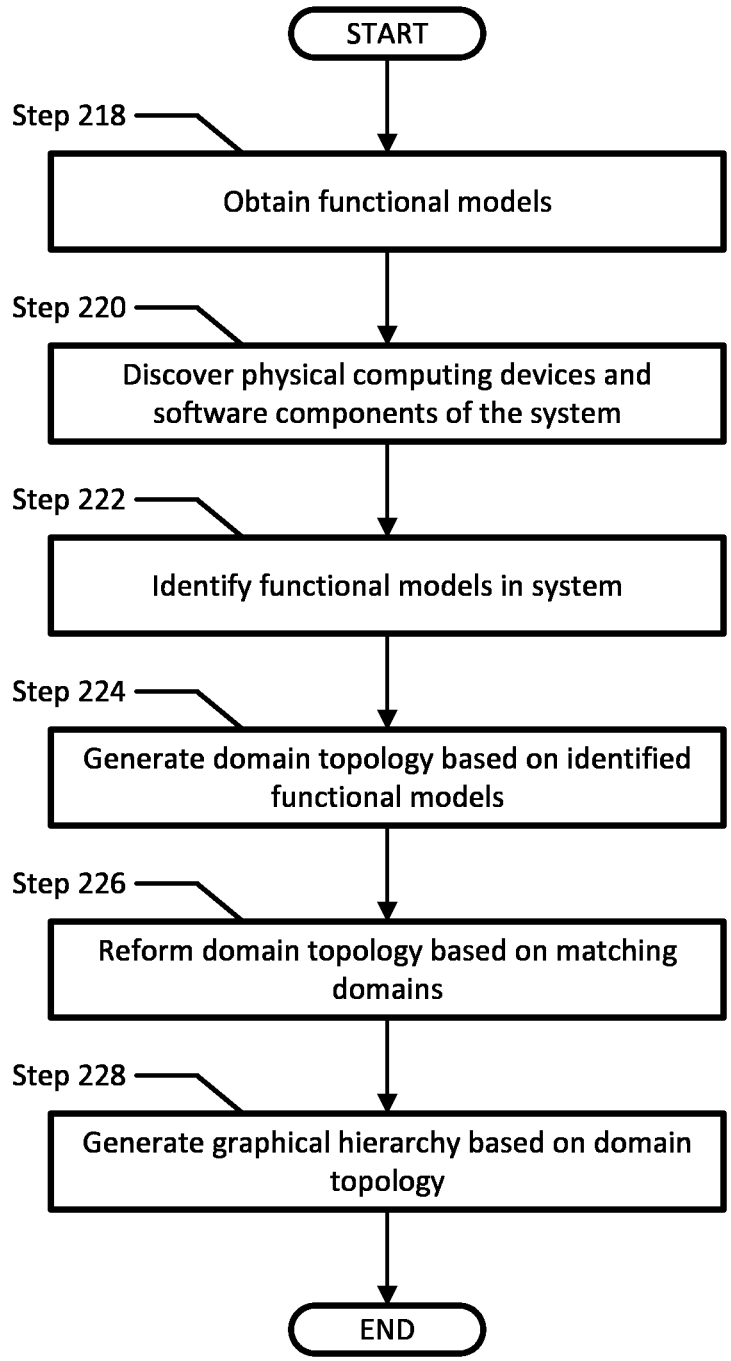
FIG. 2C shows a flowchart of a method for reforming a domain topology, in accordance with one or more embodiments.

FIG. 2C shows a flowchart of a method for reforming a domain topology, in accordance with one or more embodiments. All or a portion of the method shown may be performed by the orchestrator. However, another component of the system may perform this method without departing from the embodiments disclosed herein. While the various steps in this flowchart are presented and described sequentially, one of ordinary skill in the relevant art (having the benefit of this detailed description) would appreciate that some or all of the steps may be executed in different orders, combined, or omitted, and some or all steps may be executed in parallel.

In Step 218, the orchestrator obtains functional models and stores them in the functional model database. This step may be substantially similar to Step 206.

In Step 220, the orchestrator discovers the physical computing devices and software components of the system. In one or more embodiments, the orchestrator uses device scanning software to identify devices and software executing within the system. In one or more embodiments, an orchestrator may interface with an existing management software that tracks devices and software executing within the system. In one or more embodiments, the orchestrator utilizes the computing resource database (112) and/or allocation database (113) to identify devices and software executing within the system.

In Step 222, the orchestrator identifies one or more functional model(s) in the system. In one or more embodiments, the orchestrator may analyze the system and identify configurations of hardware and/or software (e.g., virtual machines) that match functional model parameters (in the functional model database). In one or more embodiments, the orchestrator may identify matching functional model(s) based on the functional model capabilities matching the functions of components of the underlying system.

In Step 224, the orchestrator generates a domain topology using the identified functional models. In one or more embodiments, the hardware and/or software included in each identified functional model is aggregated into a single domain. In turn, the orchestrator generates a domain entry for each domain in the domain topology database. In one or more embodiments, at this step, the orchestrator may only generate domains based on identified functional models (e.g., aggregating individually distinguishable components).

In Step 226, the orchestrator reforms the domain topology to aggregate (e.g., "fold", "merge") similar domains into larger domains. In one or more embodiments, the orchestrator identifies domains that were created using the same functional model (i.e., having the same functional model identifier). Then, the orchestrator generates superset domain that includes those similar domains. As a non-limiting example, in Step 224, ten heating-ventilation-air-conditioning (HVAC) domains may be created using the same functional identifier. Accordingly, the orchestrator may create a new "HVAC" superset domain that includes all ten of the originally generated HVAC domains—thereby simplifying the domain topology at the top-level (replacing ten domains with one domain).

In one or more embodiments, the orchestrator may generate superset domains based on partial matching functionality of existing domains. As a non-limiting example, in step 224, an SSD management domain may be created, an HDD management domain may be created, and a memory management domain may be created. Although all three domains were created with different functional models, an orchestrator may identify that each functional model includes the tag "storage". Accordingly, the orchestrator generates a single "storage" superset domain that includes all three of the different subdomains previously-created (i.e., the SSD management domain, the HDD management domain, and the memory management domain).

In Step 228, the orchestrator generates a graphical hierarchy based on the domain topology. In one or more embodiments, the graphical hierarchy may be provided to a user of the system via software and/or a web interface that may be generated on a visual display device (e.g., a computer monitor). In one or more embodiments, a user may interact with the graphical hierarchy to identify system components included in any domain (and any functional model based thereon).

In one or more embodiments, reforming the domain topology may be initiated by a user (e.g., a user wishing to simplify a graphical hierarchy generated from the domain topology). A user may utilize a user interface of the system to initiate reforming of the domain topology (e.g., by clicking a button, entering a command, "zooming out" of a graphical hierarchy displaying the domain topology, etc.).

FIG. 3A

Figure 3A:
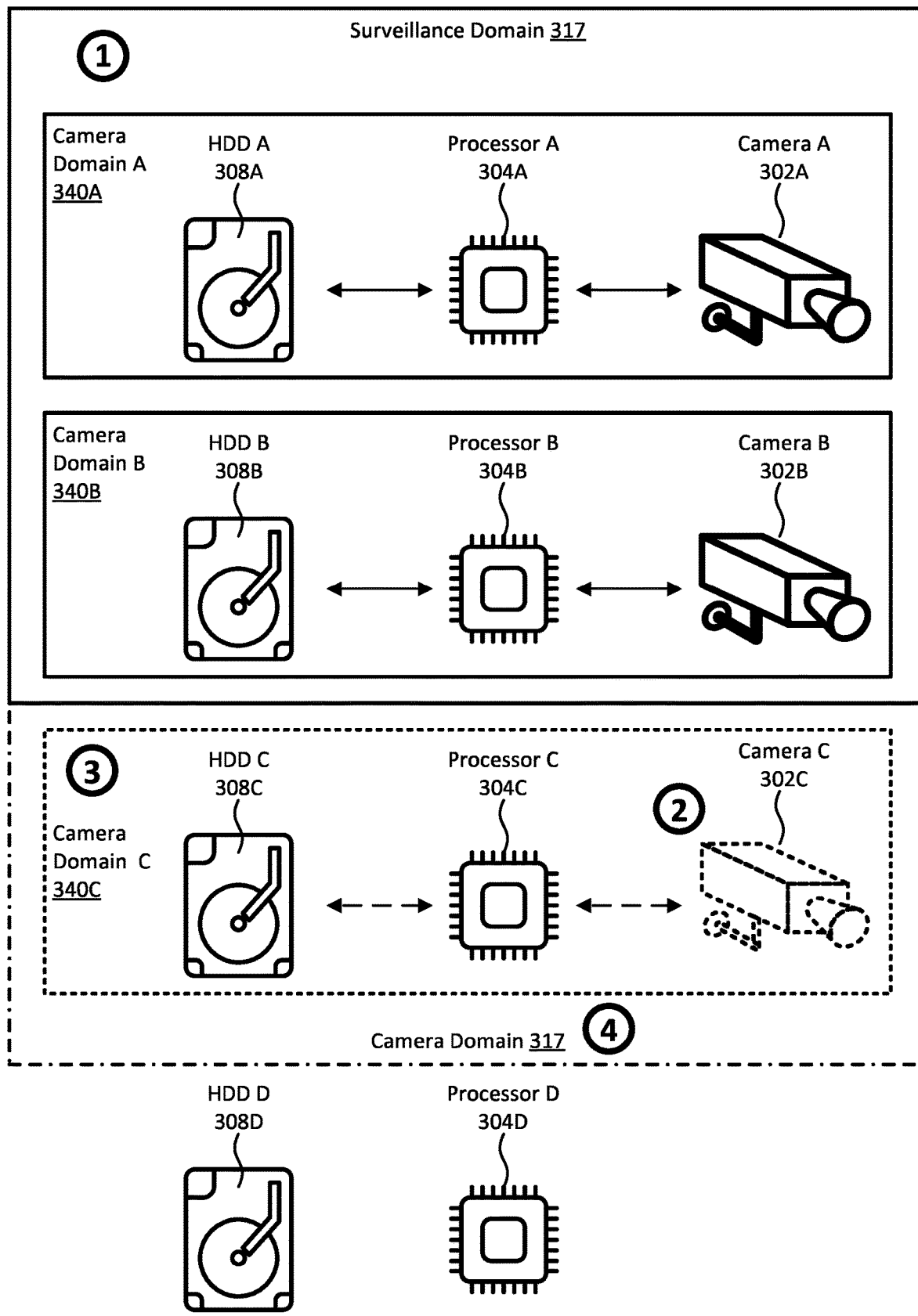
FIG. 3A shows an example of adding a new component to a system then identifying applicable domains for organization.

FIG. 3A shows an example of adding a new component to a system then identifying applicable domains for organization. The example is not intended to limit the scope of the technology.

At (1), a system exists with four hard drive disks (HDD A (308A), HDD B (308B), HDD C (308C), and HDD D (308D)), four processors (processor A (304A), processor B (304B), processor C (304C), and processor D (304D)), and two cameras (camera A (302A) and camera B (302B)).

A functional model (in the functional model database (not shown)) has functional model capabilities describing the capability to stream video from a camera (302) at a specific resolution and framerate, compress the video on a processor (304) using a specific codec, and store the compressed video on a dedicated HDD (308).

The combination of HDD A (308A), processor A (304A), and camera A (302A) satisfy the functional model parameters of the functional model. Accordingly, the orchestrator assigns these three components (308A, 304A, 302A) into camera domain A (340A). Similarly, HDD B (308B), processor B (304B), and camera B (302B) are assigned into camera domain B (340B), for the same reason. Further, in order to generate a simplified graphical hierarchy of the domain topology, the orchestrator generates a surveillance domain (317) that includes each of the camera domains (340A, 340B).

At (2), camera C (302C) is installed into the system. Camera C (302C) captures video at the same resolution and framerate as the already-installed cameras (302A, 302B). After camera C (302C) is installed, processor C (304C) is configured to stream, compress the video using a specific codec, and store compressed video on HDD C (308C). Accordingly, HDD C (308C), processor C (304C), and camera C (302C) satisfy the functional model capabilities of the camera model function (340).

Accordingly, at (3), HDD C (308C), processor C (304C), and camera C (302C) are assigned into a newly-created camera domain C (340C). At (4), the orchestrator expands the surveillance domain (317) to include camera domain C (340C), as the surveillance domain (317) groups together each subset camera domain (340).

FIG. 3B

Figure 3B:
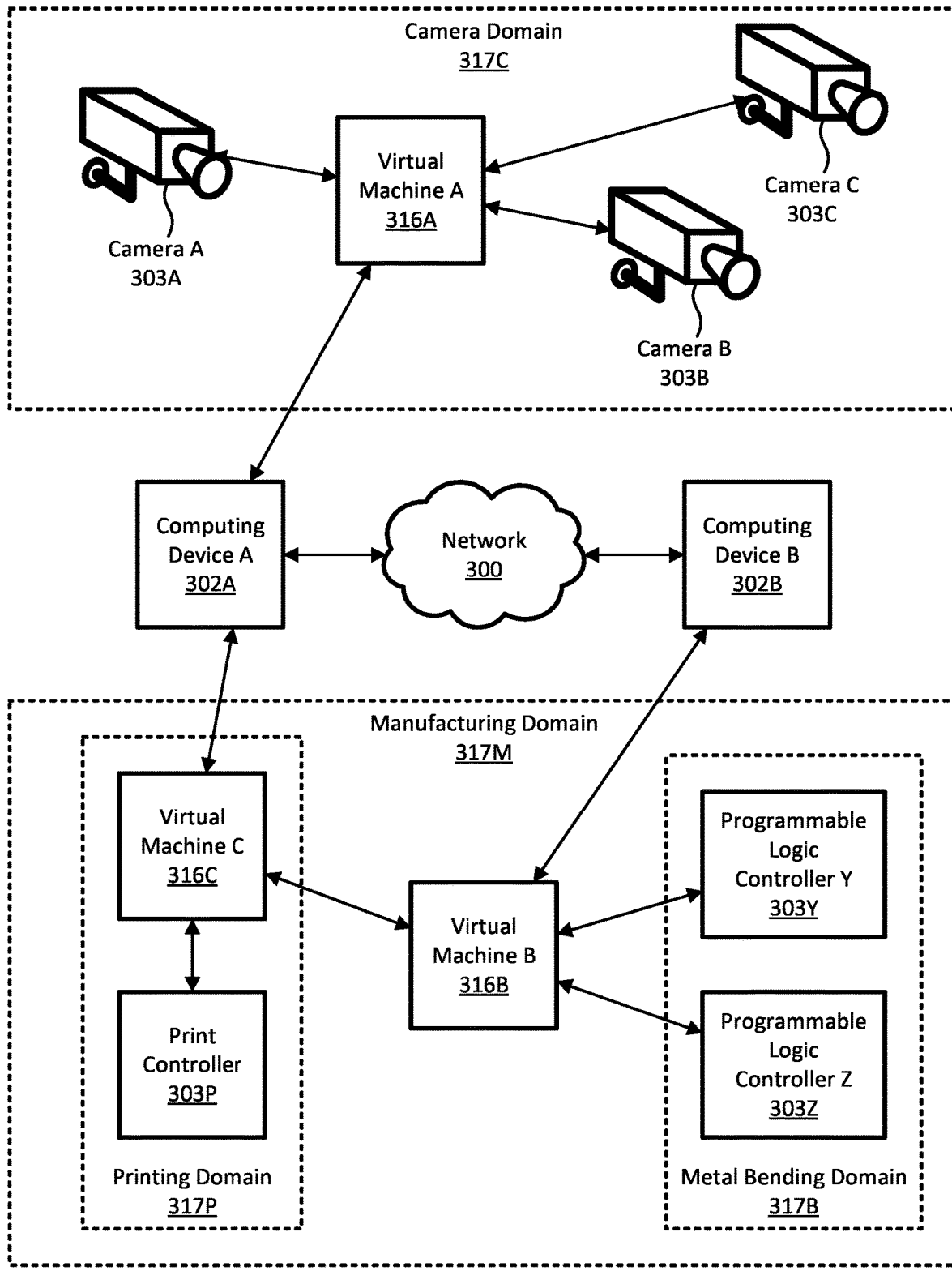
FIG. 3B shows an example of a system.
Figure 3C:
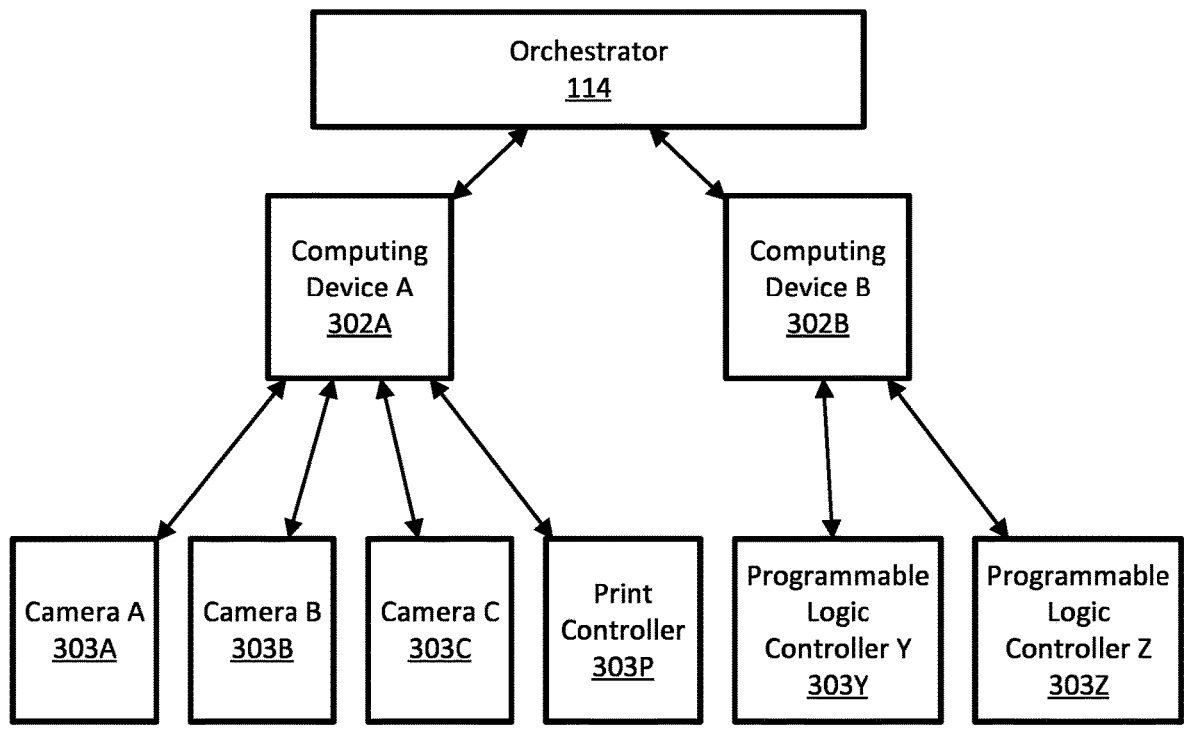
FIG. 3C shows an example of a hardware diagram of the example system of FIG. 3B.
Figure 3D:
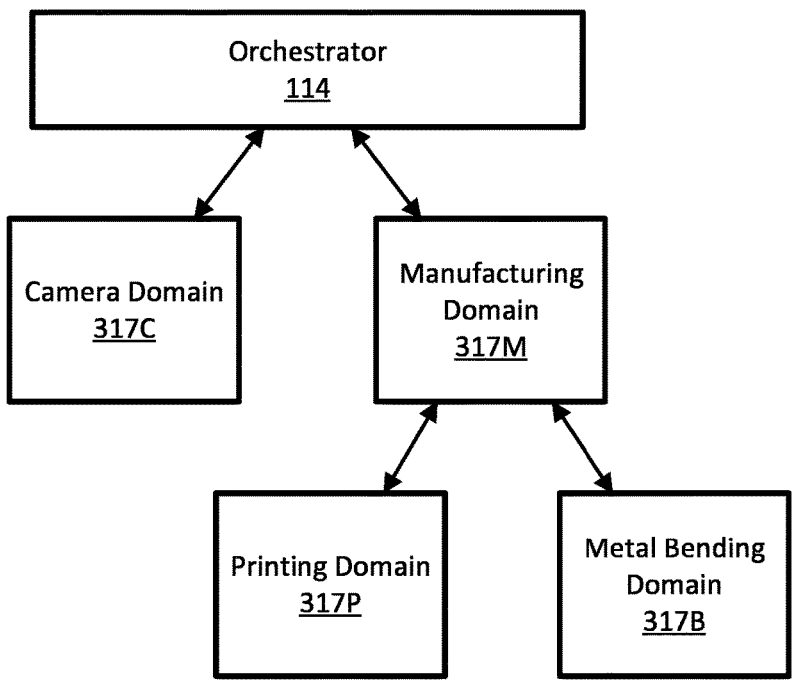
FIG. 3D shows an example of domain topology of the example system of FIG. 3B.

FIG. 3B shows an example of a system. The example is not intended to limit the scope of the technology. The example of FIG. 3B is meant to demonstrate how a seemingly simple system of hardware devices and software components can produce a moderately complicated graphical layout. Simplified versions of the system of FIG. 3B are depicted in FIG. 3C and FIG. 3D to provide an example of a compacted domain topology that may be generated using one or more methods disclosed herein.

The system includes two computing devices (computing device A (302A) and computing device B (302B)) connected via network (300). Three virtual machines (virtual machine A (316A), virtual machine B (316B), and virtual machine C (316C)) execute on one or both of the computing devices (302) (indicated by connecting lines).

Virtual machine A (316) is used for the capture, processing, and storage of video data from three cameras (camera A (303A), camera B (303B), and camera C (303C)). Virtual machine B (316B) is used for all manufacturing tasks and directly interfaces with two programmable logic controllers (programmable logic controller Y (303Y) and programmable logic controller Z (303Z)) and indirectly interfaces with a print controller (303P) via virtual machine C (316C). In turn virtual machine C (316C) directly interfaces with the print controller (303P).

Further, as shown in dashed-line boxes, the orchestrator identifies several domains (317) based on matching functional models. The three cameras (303A, 303B, 303C) and virtual machine A (316A) are grouped into a camera domain (317C). Virtual machine C (316C) and the print controller (303P) are grouped into a printing domain (317P). Both of the programmable logic controllers (303Y, 303Z) are grouped into a metal bending domain (317B). And, the printing domain (317P), the metal bending domain (317B), and virtual machine B (316B) are grouped into a manufacturing domain (317M).

FIG. 3C

FIG. 3C shows an example of a hardware diagram of the example system of FIG. 3B. The example is not intended to limit the scope of the technology. As part of the process of examining an existing system, the orchestrator (114) identifies all of the underlying hardware devices that are included in the system and the physical connections between those devices. Accordingly, the hardware diagram of FIG. 3C includes all of the same hardware components shown in FIG. 3B, but does not show any of the virtual, logical, or software components (except for the added orchestrator (114)).

Accordingly, as shown in FIG. 3C, there are two computing devices (computing device A (302A) and computing device B (302B)). For computing device A (302A), there is a print controller (303P) and three cameras (camera A (303A), camera B (303B), camera C (303C) connected thereto. And, for computing device B (302B), there are two programmable logic controllers (programmable logic controller Y (303Y) and programmable logic controller Z (303Z)) connected thereto.

FIG. 3D

FIG. 3D shows an example of domain topology of the example system of FIG. 3B. The example is not intended to limit the scope of the technology. As part of the process of analyzing an existing system, an orchestrator (114) analyzes each of the physical, virtual, and software components of the system and identifies the capabilities of those components. Then, using the functional model database (not shown), the orchestrator identifies functional models that match the identified capabilities of the components.

As shown in FIG. 3B, the camera domain (317C) of FIG. 3C includes each of the three cameras (303A, 303B, 303C) and virtual machine A (316A) that controls their operations and processes the video streams.

The manufacturing domain (317M) includes the entirety of the printing domain (317P), the metal bending domain (317B), and virtual machine B (316B) (directly). As virtual machine B (316B) interfaces with both the printing domain (317P) and metal bending domain (317B), it cannot be categorized exclusively into either one of those domains exclusively. Yet, as the provided graphical hierarchy (of the domain topology) excludes virtual machines (316) (showing only their broader domain), there is less clutter to obfuscate the broader workings of the system.

Comparing FIG. 3D to FIG. 3C, it can be seen that by collapsing several of the components into domains (based on their functionality), a more understandable domain topology is generated. For example, the computing devices (302A, 302B) do not evenly divide the camera domain (317C) from the manufacturing domain (317M)—as computing device A (302A) is hosting virtual machines (316A, 316C) in both the camera domain (317C) and the manufacturing domain (317M). However, by excluding general purpose computing devices (302) that can host many types of software, and instead grouping components based on capability and/or functionality, a much cleaner and understandable domain topology is produced.

FIG. 3E

Figure 3E:
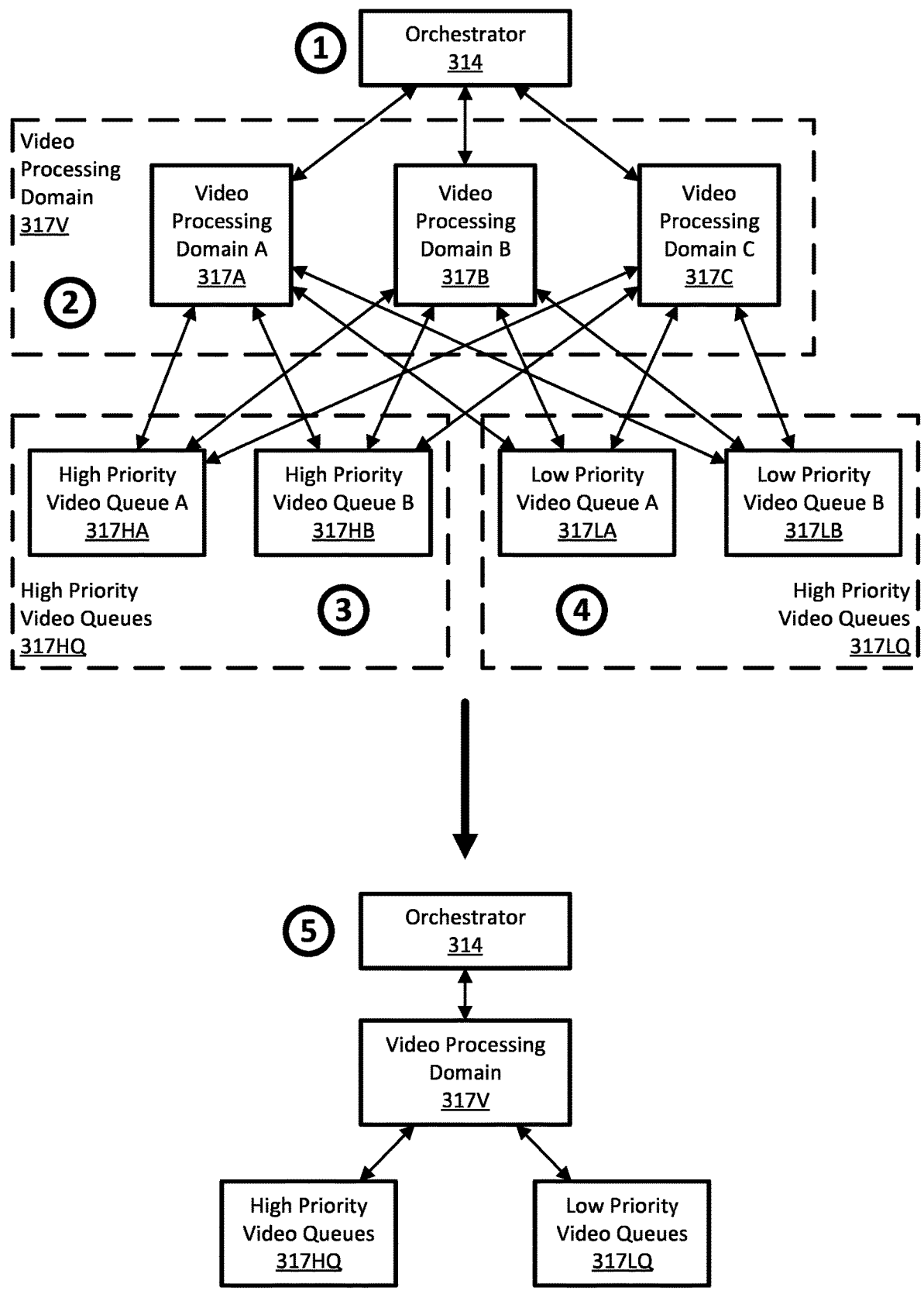
FIG. 3E shows an example of merging a domain topology based on similar capabilities.

FIG. 3E shows an example of merging a domain topology based on similar capabilities. The example is not intended to limit the scope of the technology.

At (1), as shown at the top of FIG. 3E, there is a graphical hierarchy that includes an orchestrator (314) that manages three video processing domains (video processing domain A (317A), video processing domain B (317B), and video processing domain C (317C)). Further, there are two high priority video queues (high priority video queue A (317HA) and high priority video queue B (317HB)) and two low priority video queues (low priority video queue A (317LA) and low priority video queue B (317LB)). Each of the four video queues (317HA, 317HB, 317LA, 317LB) feeds into any of the three video processing domains (317A, 317B, 317C).

At (2), as part of the topology reformation process, the orchestrator (314) identifies common functionalities among the components and identifies properties of those components that allows for a broader, superset domain (317) to be assigned. For the three video processing domains (317A, 317B, 317C), the orchestrator (314) identifies that each domain is associated with the same functional models (e.g., via the functional model identifiers matching in each of the three domain entries). Accordingly, the orchestrator generates a single superset video processing domain (317V) that includes each of the independently defined video processing domains (317A, 317B, 317C).

At (3), as part of the topology reformation process, the orchestrator (314) identifies common functionalities of the high priority video queues (317HA, 317HB). Similar to (2), the orchestrator (314) identifies that each domain is associated with the same functional models. Accordingly, a broader high priority video queues (317HQ) domain is defined that includes both of the high priority video queues (317HA, 317HB).

At (4), as part of the topology reformation process, the orchestrator (314) identifies common functionalities of the low priority video queues (317LA, 317LB). Similar to (2) and (3), the orchestrator (314) identifies that each domain is associated with the same functional models. Accordingly, a broader low priority video queues (317LQ) domain is defined that includes both of the low priority video queues (317LA, 317LB).

At (5), the reformed and simplified graphical hierarchy is shown. As many of the components were categorized into broader domains (317V, 317HQ, 317LQ), the topology is simplified and easier to understand and manage. Further, as all domains were merged based on matching functional models, no information is lost in the merging process, despite making the domain topology much simpler.

FIG. 3F

Figure 3F:
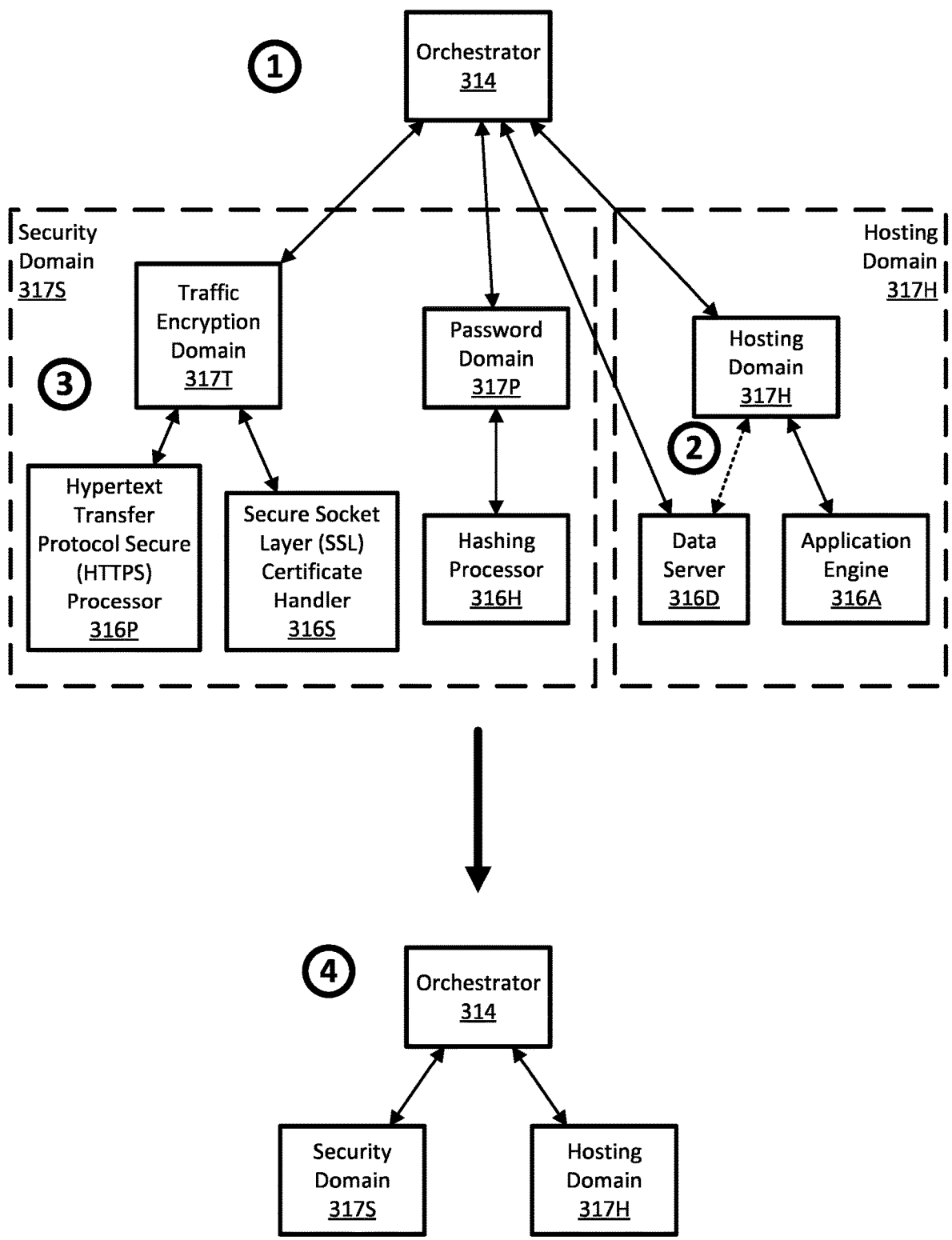
FIG. 3F shows an example of merging a domain topology based on partially similar capabilities.

FIG. 3F shows an example of merging a domain topology based on partially similar capabilities. The example is not intended to limit the scope of the technology.

At (1), as shown at the top of FIG. 3F, there is a graphical hierarchy that includes an orchestrator (314) that manages a traffic encryption domain (317T), a password domain (317P), a hosting domain (317H), and a data server (316D). Further, the traffic encryption domain (317T) includes a hypertext transfer protocol secure (HTTPS) processor (316P) and a secure socket layer (SSL) certificate handler (316S). The password domain (317P) includes a hashing processor (316H). And, the hosting domain (317H) includes an application engine (316A).

At (2), as part of the topology reformation process, the orchestrator (314) identifies common functionalities among the components and identifies properties of those components that allows for a broader domain (317) to be assigned. For the hosting domain (317H), the orchestrator finds that the data server (316D) is defined as being capable of performing workloads related to the hosting domain (317H) (as defined in the domain topology database (not shown)). Accordingly, the data server (316D) is redefined (i.e., the associated domain entry is updated) to show that the data server (316D) belongs to the hosting domain (317H).

At (3), the orchestrator identifies that the traffic encryption domain (317T) and the password domain (317P) both share common properties that belong to a defined security domain (317S) (as defined in the domain topology database (not shown)). Accordingly, both the traffic encryption domain (317T) and the password domain (317P) (and all of their subcomponents) are aggregated together into the broader security domain (317S).

At (4), the reformed and simplified graphical hierarchy is shown. As many of the components were categorized into larger domains (317), the topology is simplified and easier to understand and manage.

What is claimed is:

1. A method for generating a domain topology for a system, the method comprising:
   accessing a functional model database;
   identifying, in a computing resource database, a first configuration of components matching a first functional model in the functional model database, the first functional model representing a manifest used to create a first virtual machine configured to serve a function, wherein the first virtual machine uses the first configuration of components and the first configuration of components is identified using device scanning software that tracks devices and software executing within the system;
   generating a first domain for the first configuration of components, in the domain topology, wherein the domain topology comprises a second domain for a second configuration of components matching a second functional model;
   generating a graphical hierarchy of the domain topology and providing the graphical hierarchy to a user via a visual display device, wherein the graphical hierarchy shows a connection between the first domain and the second domain;
   after generating the graphical hierarchy:
     identifying, in the computing resource database, a third configuration of components matching the first functional model;
     generating a third domain for the third configuration of components, in the domain topology;
     generating a superset domain, wherein the superset domain aggregates the first domain and the third domain together; and
     generating a new graphical hierarchy of the domain topology and providing the new graphical hierarchy to the user via the visual display device, wherein the graphical hierarchy shows a connection between the superset domain and the second domain.

2. The method of claim 1, wherein generating the superset domain is based on an identification that the first domain and the third domain match the same functional model.

3. The method of claim 2, wherein generating the superset domain is initiated based on an input of the user.

4. A non-transitory computer readable medium comprising instructions which, when executed by a processor, enables the processor to perform a method for generating a domain topology for a system, the method comprising:
   accessing a functional model database;
   identifying, in a computing resource database, a first configuration of components matching a first functional model in the functional model database, the first functional model representing a manifest used to create a first virtual machine configured to serve a function, wherein the first virtual machine uses the first configuration of components and the first configuration of components is identified using device scanning software that tracks devices and software executing within the system;
   generating a first domain for the first configuration of components, in the domain topology, wherein the domain topology comprises a second domain for a second configuration of components matching a second functional model; and
   generating a graphical hierarchy of the domain topology and providing the graphical hierarchy to a user via a visual display device, wherein the graphical hierarchy shows a connection between the first domain and the second domain;

after generating the graphical hierarchy:
identifying, in the computing resource database, a third configuration of components matching the first functional model;
generating a third domain for the third configuration of components, in the domain topology;
generating a superset domain, wherein the superset domain aggregates the first domain and the third domain together; and
generating a new graphical hierarchy of the domain topology and providing the new graphical hierarchy to the user via the visual display device, wherein the graphical hierarchy shows a connection between the superset domain and the second domain.

5. The non-transitory computer readable medium of claim 4, wherein generating the superset domain is based on an identification that the first domain and the third domain match the same functional model.

6. The non-transitory computer readable medium of claim 5, wherein generating the superset domain is initiated based on an input of the user.

7. A computing device, comprising:
a visual display device;
a processor; and
memory storing instructions which, when executed by the processor, enables the processor to perform a method for generating a domain topology for a system, the method comprising:
accessing a functional model database;
identifying, in a computing resource database, a first configuration of components matching a first functional model in the functional model database, the first functional model representing a manifest used to create a first virtual machine configured to serve a function, wherein the first virtual machine uses the first configuration of components and the first configuration of components is identified using device scanning software that tracks devices and software executing within the system;
generating a first domain for the first configuration of components, in the domain topology, wherein the domain topology comprises a second domain for a second configuration of components matching a second functional model; and
generating a graphical hierarchy of the domain topology and providing the graphical hierarchy to a user via the visual display device, wherein the graphical hierarchy shows a connection between the first domain and the second domain;

after generating the graphical hierarchy:
identifying, in the computing resource database, a third configuration of components matching the first functional model;
generating a third domain for the third configuration of components, in the domain topology;
generating a superset domain, wherein the superset domain aggregates the first domain and the third domain together; and
generating a new graphical hierarchy of the domain topology and providing the new graphical hierarchy to the user via the visual display device, wherein the graphical hierarchy shows a connection between the superset domain and the second domain.

8. The computing device of claim 7, wherein generating the superset domain is based on an identification that the first domain and the third domain match the same functional model, wherein generating the superset domain is initiated based on an input of the user.

* * * * *